United States Patent
Raisoni et al.

(10) Patent No.: US 8,738,761 B2
(45) Date of Patent: May 27, 2014

(54) METHOD AND SYSTEM TO CAPTURE AND PLAYBACK NETWORK ACTIVITY

(75) Inventors: Tarun Raisoni, San Jose, CA (US); Manuel Angel Diaz, Gilroy, CA (US)

(73) Assignee: Cisco Technology, Inc., San Jose, CA (US)

( * ) Notice: Subject to any disclaimer, the term of this patent is extended or adjusted under 35 U.S.C. 154(b) by 1138 days.

(21) Appl. No.: 11/379,216

(22) Filed: Apr. 18, 2006

(65) Prior Publication Data

US 2007/0245015 A1    Oct. 18, 2007

(51) Int. Cl.
 *G06F 15/173*    (2006.01)
(52) U.S. Cl.
 USPC ............ 709/224; 709/223; 709/217; 709/203
(58) Field of Classification Search
 USPC ................... 709/223–226, 21, 230, 250, 202, 709/217–218, 203, 221
 See application file for complete search history.

(56) References Cited

U.S. PATENT DOCUMENTS

| | | | | |
|---|---|---|---|---|
| 5,907,696 | A * | 5/1999 | Stilwell et al. | 703/13 |
| 5,923,850 | A * | 7/1999 | Barroux | 709/224 |
| 6,209,033 | B1 * | 3/2001 | Datta et al. | 709/224 |
| 6,269,401 | B1 * | 7/2001 | Fletcher et al. | 709/224 |
| 6,393,486 | B1 * | 5/2002 | Pelavin et al. | 709/238 |
| 6,453,268 | B1 * | 9/2002 | Carney et al. | 702/186 |
| 6,687,748 | B1 * | 2/2004 | Zhang et al. | 709/223 |
| 7,013,251 | B1 * | 3/2006 | Nace et al. | 703/13 |
| 7,200,545 | B2 * | 4/2007 | Lines et al. | 703/21 |
| 7,711,751 | B2 * | 5/2010 | Kelley et al. | 707/791 |
| 7,822,837 | B1 * | 10/2010 | Urban et al. | 709/223 |
| 2002/0120737 | A1 * | 8/2002 | Martin et al. | 709/224 |
| 2003/0110252 | A1 * | 6/2003 | Yang-Huffman | 709/224 |
| 2003/0145039 | A1 * | 7/2003 | Bonney et al. | 709/202 |
| 2005/0018602 | A1 * | 1/2005 | Labovitz | 370/229 |
| 2005/0071445 | A1 * | 3/2005 | Siorek et al. | 709/223 |
| 2006/0059253 | A1 * | 3/2006 | Goodman et al. | 709/223 |
| 2007/0067450 | A1 * | 3/2007 | Malloy et al. | 709/224 |

OTHER PUBLICATIONS

"Xaffire : Web Session and Transaction Capture, Recording, and Playback With xFire", http://web.archive.org/web/20040607062450/http://www.xaffire.com/, (archived Jun. 7, 2004), 1 pg.

Franklin, Jr., C., "20/20 Foreseight", http://www.networkcomputing.com/showitem.jhtml?docid=1420sp1, (published online by Network Computing), (Oct. 2, 2003), 4 pgs.

Massad, B., et al., "Embedding Call Monitoring in VoIP Designs", http://www.commsdesign.com/design_corner/OEG20020501S0018, (published online by CommsDesign),(May 1, 2002), 7 pgs.

\* cited by examiner

*Primary Examiner* — Wing F Chan
*Assistant Examiner* — Benjamin M. Thieu
(74) *Attorney, Agent, or Firm* — Schwegman Lundberg & Woessner, P.A.

(57) ABSTRACT

A method and system to capture and playback network activity are disclosed. The system comprises a recorder to continuously record data directly from a live network over a selected period of time. The system also comprises a simulator to create a simulated network based on the data recorded by the recorder, so that a network management application can be run against the simulated network. Conveniently, the system further comprises a selector to allow a user to identify at least one network device that is to be recorded. The selector may also be used to allow the user to specify the network device's parameters and/or properties that are to be recorded by the recorder, and to select the period of time that the recorder is to continuously record data from the live network.

26 Claims, 4 Drawing Sheets

METHOD AND SYSTEM TO CAPTURE AND PLAYBACK NETWORK ACTIVITY

TECHNICAL FIELD

The present application is related to the field of network management systems and methods of operation, and in an example embodiment to a method and system to capture network activity or events from a live network and to playback the captured network activity or events in a simulated environment using a network management application.

BACKGROUND

Network management applications monitor a network and provide functionality to configure and correct any destructive changes in the network. It may be vital that the network management application be able to accurately correct the faults in the network. The ability to test this scenario may be crucial to developing quality network management software. The current mechanism of testing this scenario is by inducing faults in a laboratory network or simulated network, and seeing how the network management application behaves to this change. When a customer reports a problem in the network management application that failed so that corrective action may be taken, it may be impossible to reproduce the exact sequence of events leading to the failure scenario within a laboratory. Also, in a non-laboratory environment, it is difficult to test networks, primarily because of their size and also for security reasons.

DETAILED DESCRIPTION

Figure 1:
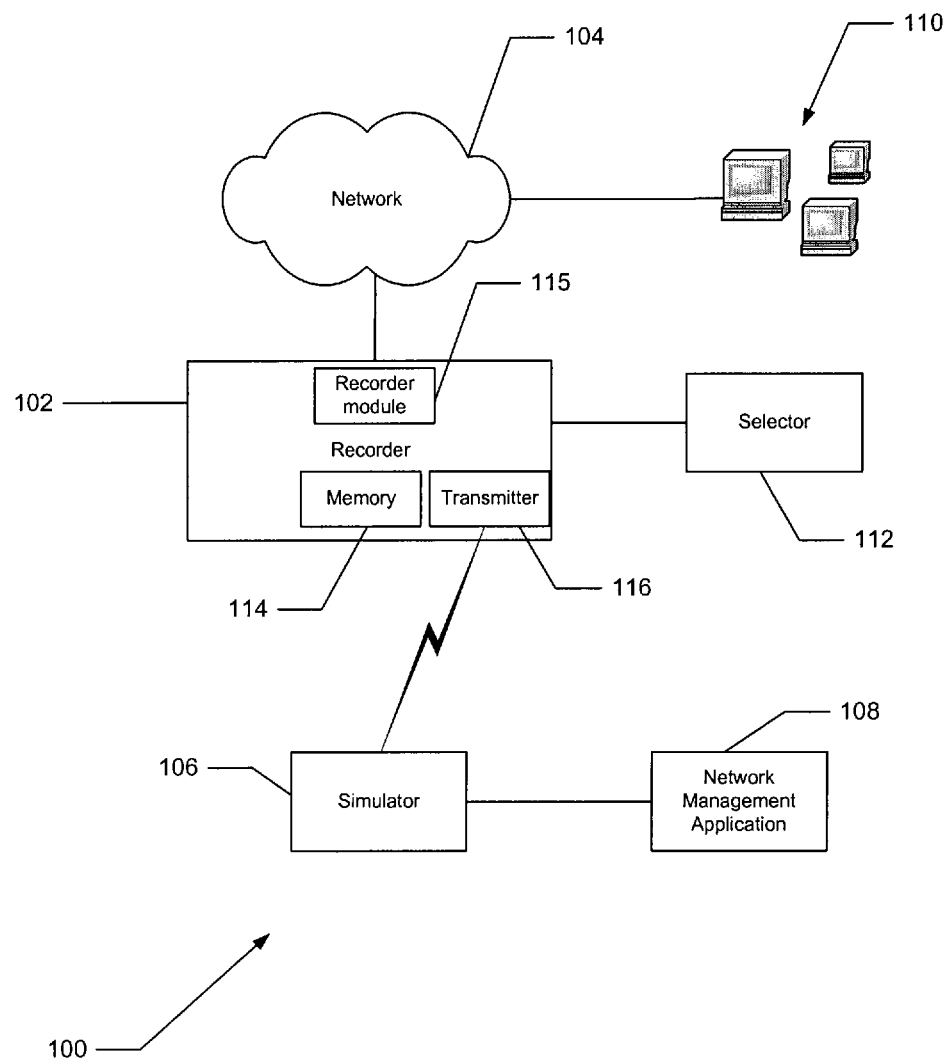
FIG. 1 shows a schematic diagram of a system, according to an example embodiment, to capture and playback network activity.

Referring to FIG. 1, in an embodiment, a system 100 to capture and playback network activity comprises a recorder 102 (including a recorder module 115) to record data (e.g., continuously) directly from a live network 104 over a selected duration or period of time. The system 100 further comprises a simulator 106 to create a simulated network based on the data recorded by the recorder 102, so that a network management application 108 can be run against the simulated network.

The network 104 may be connected to a plurality of network devices, indicated generally by arrow 110, with, in one embodiment, the system 100 including a selector 112 to allow a user to select which network device 110 is to be recorded. The selector 112 may further allow the user to specify the parameters and/or properties of selected network devices 110 that are to be recorded by the recorder 102. Thus, the simulator 106 may collect device properties and monitor device parameters, so that when there is a change in either the device property or the device parameter, corresponding changes are made in the simulator 106.

Examples properties of network devices 110 that may be collected include, but are not limited to:
1. IOS Version running on the device
2. IP Address of the device
3. Device Host name
4. Device Type
5. Modules on the device
6. Interfaces on the device
7. Number of power systems on the device
8. How long the device has been up for
9. Serial numbers of the device
10. Chassis information of the device
11. Number of CPU's on the device Examples parameters of network devices 110 that may be monitored include, but are not limited to:
1. Other devices that the device is connected to
2. SNMP MIB Based information on the device. This may include MIB Table like RFC-1213, IF-MIB, CISCO-CDP-MIB and CISCO-CHASSIS-MIB
3. IOS CLI Commands that have been executed on the device
4. Syslog messages sent from the device
5. Trap messages sent from the device
6. Telnet and SSH logging of user interactions
7. Changes to the IOS Configuration on the device
8. Interface IP Addresses that are changed on the device
9. Failure events on the device like card failure or processor failure
10. Performance statistics of the device, including CPU performance and memory performance.

The selector 112 may allow the user to select a period of time that the recorder 102 is to record data from the live network 104. In an example embodiment, the recorder records data in a substantially continuous manner (e.g., at relatively short time intervals). The following is an example pseudo algorithm that may be used to capture this information:

```
/*      While (Current Time < Time to Record)
*           {
*                   Capture Network Information Model in to snapshot
*                   Capture database of the NM Application in snapshot
*                   Associate this snapshot with Current Time
*                   Wait for some time
*                   Return back to the while loop
*           }
*/
```

The system 100 may include a memory 114 for storing the recorded data as well as a transmitter 116 for sending the recorded data to the simulator 106. Thus, advantageously, the recorder 102 may be run in the field, with the recorded data then being transmitted to a central site that may accommodate the simulator 106. It should be noted that the recorder records network data at intervals (e.g., almost continuously when the intervals are short) so that performance or operation of the network is recorded over time. In an example embodiment, the recorder records the network data continuously at time intervals in a range of 1 millisecond to 8 hours and depending on a fault event generated by the network. Unlike prior art network monitors which take a "snapshot" of network activity, in an example embodiment the recorder may record network or network device activity over a duration or period of time. The prior art systems are analogous to taking a photo or snapshot whereas in the example embodiment described herein are analogous to taking a "video".

In one embodiment, the recorder 102 starts recording after receiving an internal trigger from within the live network 104. Thus, the network 104 may send a message that something has changed, and thus the network 104 needs to be recorded.

Once the network activity has been recorded and sent to the simulator 106, the simulator 106 may either programmatically or manually recreate the monitored network device in the simulator 106, using the personalities and configurations of a similar type. The example pseudo algorithm for this may be as follows:

```
/*
* Create the simulation config
* Map the simulation device types to devices in Model
* Load the configs on the model to the device types
* Populate the MIB information in the simulation
* Populate the CDP information in the simulation
* Verify this information against the database snapshot
*/
```

Thus, in an embodiment, the simulator 106 may take the captured network data, and then correlate it back into a proper simulation. In other words, the simulator 106 may configure itself to a network device 110 on the network 104 that it is monitoring, so as to create a mirror image of that network device.

Once the data has been recorded and a mirror image of the network device 110 has been created in the simulator 106, a network management application 110 may be run against the simulated network. An example pseudo algorithm for this may be as follows:

```
/*      While (Time < Total Length of Event)
*            {
*                Start the Simulation
*                While(GetEventTime (From SnapShot) == TRUE))
*                {
*                    Change the attributes of the simulation;
*                }
*                Capture the simulation log file
*            }
*     Record the simulation end state
*/.
```

The system 100 may thus ultimately allow responses to changes to the simulated network in the network management application to be observed.

Figure 2:
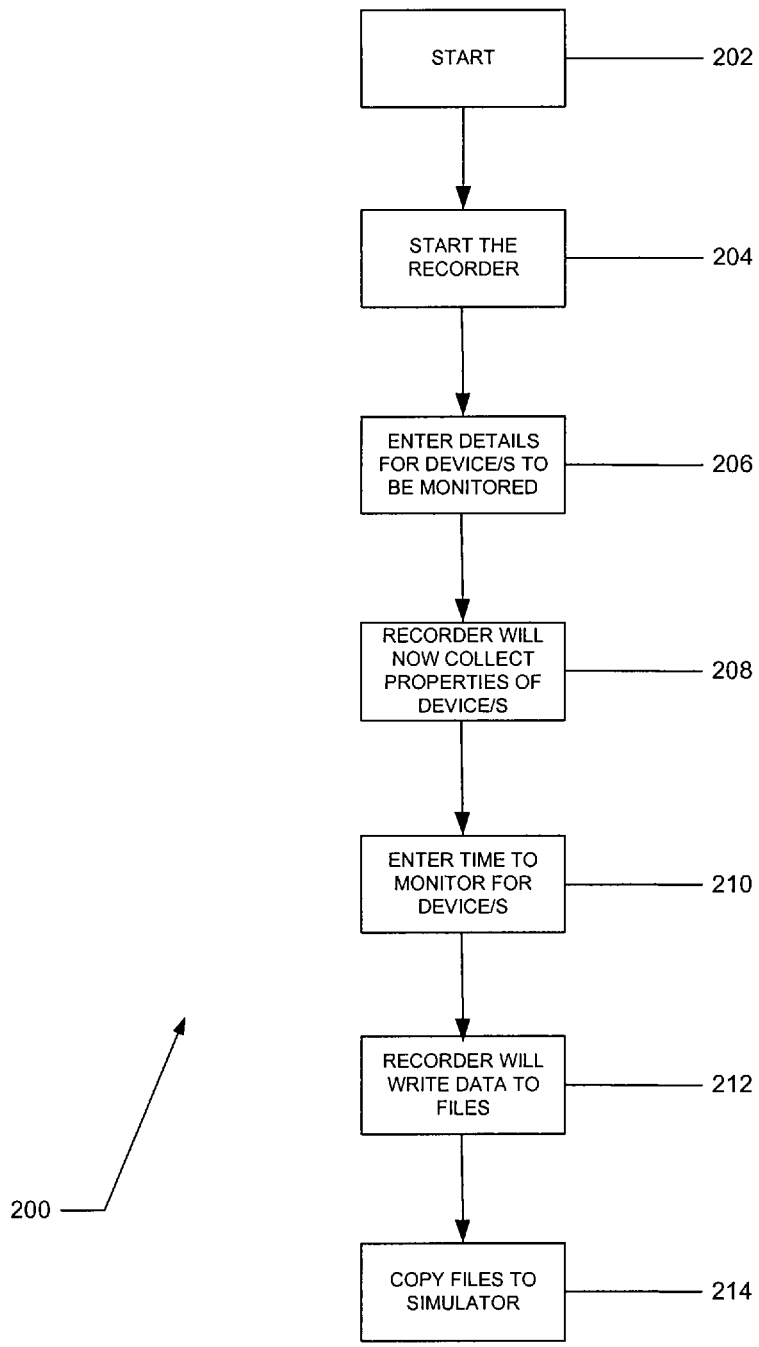
FIG. 2 shows a flow chart to illustrate a method, according to an example embodiment, that can be used to capture network activity.

Turning now to FIG. 2, a method 200 of capturing network activity, according to an example embodiment, will now be described. At the start 202, the recorder 102 first has to be started, as indicated by block 204. Thereafter, a user may enter details for the device/s to be monitored, as indicated by block 206. The recorder 102 may then start collecting properties of the relevant device(s), as indicated by block 208, as described above, with the user also, in an example embodiment, being able to enter the time over which the device(s) is to be monitored, as indicated by block 210. Thereafter, the recorder 102 may write the data to files, as indicated by block 212, and then copy the files to the simulator 106 for playback, as described above and as shown by block 214.

Figure 3:
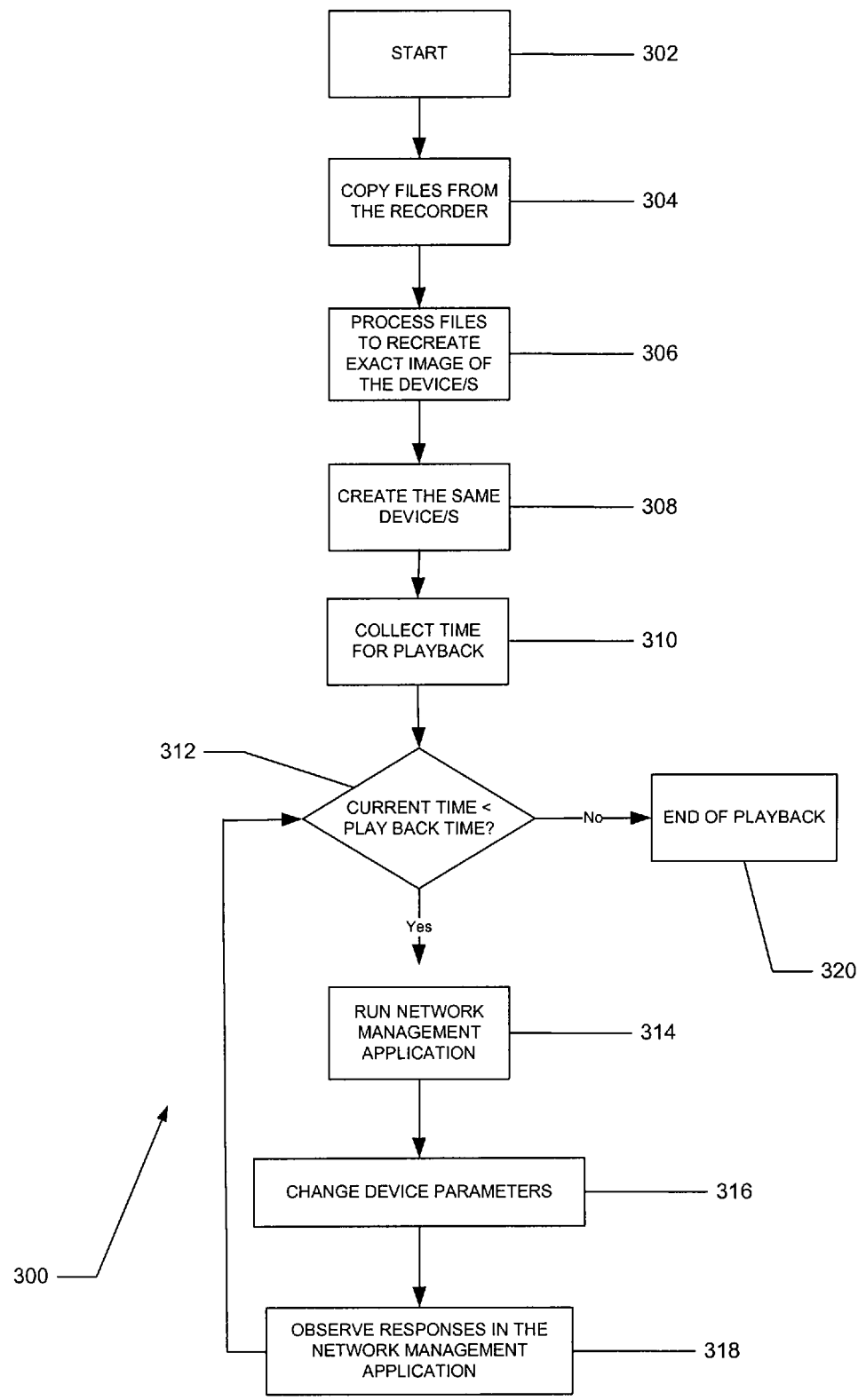
FIG. 3 shows a flow chart to illustrate a method, according to an example embodiment, that can be used by to playback captured network activity.

The playback procedure in the simulator 106 will now be described by way of example with reference to FIG. 3. The playback procedure 300 starts at block 302 by copying the files sent to it by the recorder 102, as indicated by block 304.

In an example embodiment, the simulator 106 first processes the files to recreate an exact image of the relevant network device(s) from the recorded data, as indicated by blocks 306 and 308. Thereafter, a playback time is collected, as indicated by block 310. A decision block 312 ensures that as long as the current time is less than the collected playback time, a network management application may be run against the simulated network (block 314), changes can be made to the recorded properties of the network device 110 (block 316), with responses to these changes in the network management application then being observed (block 318). As soon as the current time is greater than the collected playback time, the playback terminates, as indicated by block 320.

In an example embodiment, a Network Discovery Database stored in a network management system (NMS) may be queried using standard database query tools (SQL) to create a list of devices and their attributes from the Network Discovery Database. The attributes may include but are not limited to connectivity between the devices, faults/traps/syslogs on the network device, network device running configurations and Management Information Base (MIB) settings, network device types and model type, device Operating System version, or the like. In an example embodiment, once all the devices in the database have been processed, a simulation scenario may be created and simulation of those network devices may start within a SimCafe server. This may effectively recreate the network and device environment found in the database. In an example embodiment, if the database came from a customer site, that exact network may now be simulated in the SimCafe server.

An example embodiment of a method for creating a simulated network using, for example the SimCafe server, may be as follows:

User points to a Network Discovery Database (e.g., in Ciscoworks this is the ani.db file)
For each device object
   Extract:
      Device Type
      Network Connectivity (e.g., cisco cdp table)
      Device Configuration
      Device OS Version
      Trap/Syslogs/Faults generated on device
   Using the SysobjID, and IOS Version check for an existing SimCafe personality
   If the personality exists:
      Attach device attributes to the personality specification
   End if
   If the personality does not exist
      create a personality for that device based on the SimCafe default template
   End If
   Write the device attributes to the SimCafe build file
   Configure trap/syslog and faults for that device
End (for each device object)
Start the SimCafe server with the build file created.

In an example embodiment the same IP Address space as the real network may be used and, accordingly, in the simulation the real environment may be matched as closely as possible.

Once the simulation is ready, the NMS software may be started and it may then discover the simulated devices on the SimCafe server and testing/debugging can begin.

The present invention thus provides a system and method to record and playback network events in a simulated environment to capture faults in the network and defects in the network management application, when, for example, the network management application fails to recover the network from such a fault. The ability to record network activity from a real network, such as, for example, at a customer site, and play that back in a simulated environment in a lab, for example, is an extremely powerful network management debugging tool. This debugging strategy may, in particular, enable a faster mean time to repair which can lead to greater customer satisfaction. The ability to select the network device that is to be recorded, as well as to be able to select the network device's parameters and/or properties that are to be recorded, are both extremely advantageous features.

Figure 4:
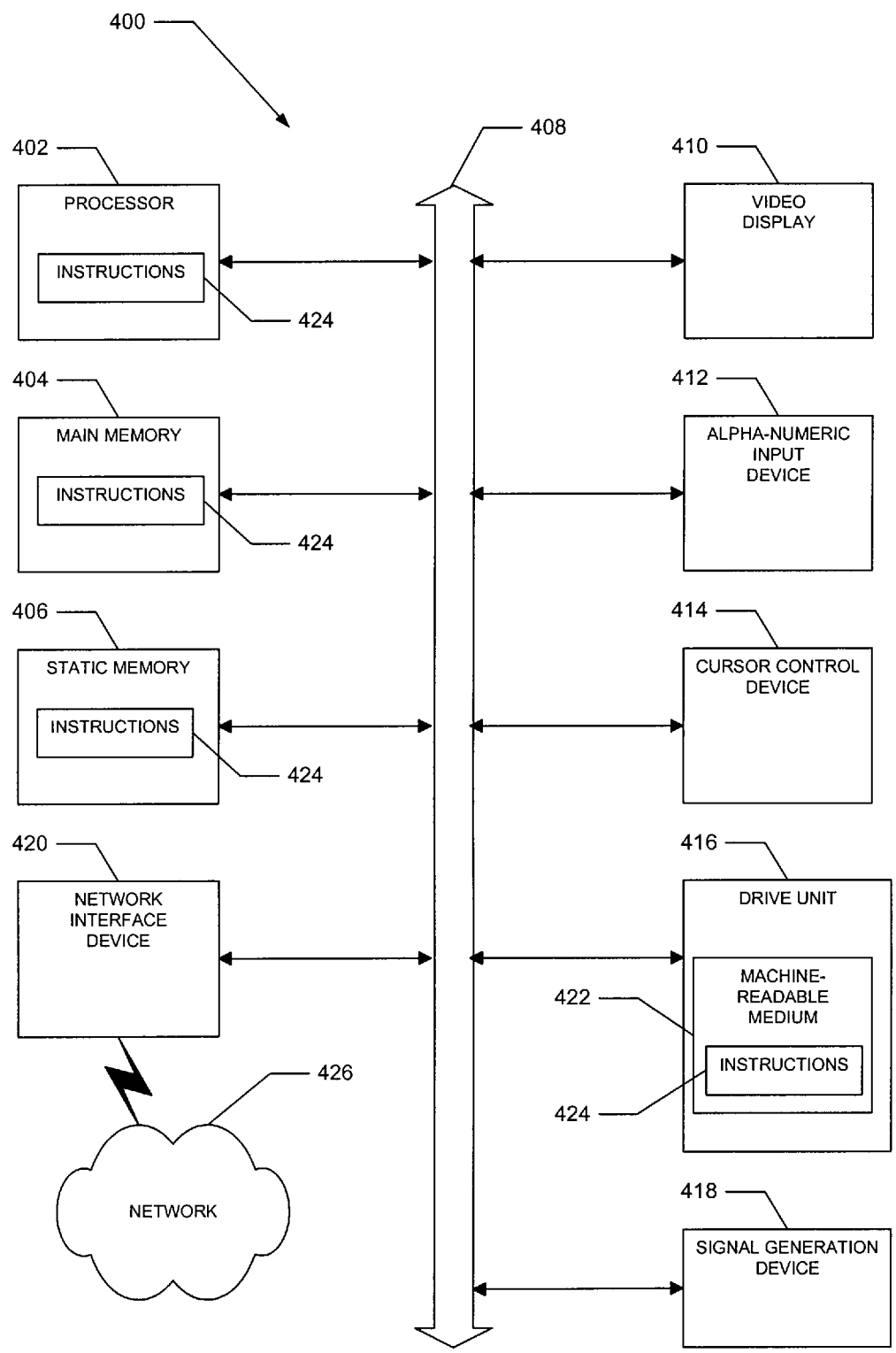
FIG. 4 shows a diagrammatic representation of machine in the example form of a computer system within which a set of instructions, for causing the machine to perform any one or more of the methodologies discussed herein, may be executed.

FIG. 4 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., HTTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform anyone or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media.

Although the present application has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system to record and simulate network activity, the system comprising:
    a recording module connectable to a live network and configured to substantially continuously record data live, over a selected duration of time, from a database of a network management application running on the live network to manage at least one network device, recording of the data to comprise capturing a plurality of snapshots of at least part of the network management application database, each of the database snapshots being associated with a respective time within the selected duration of time, the recorded data including one or more parameters of the at least one network device, which parameters include at least one of: Management Information Base (MIB) information on the device, changes to operating system configuration on the device, interface IP address changes on the device, and Command Line Interface (CLI) commands executed on the device;
    memory to store the recorded data for subsequent simulation of network activity; and
    a simulator configured to create, based substantially exclusively on data recorded by the recording module from the network management application database, a simulated network and simulated network activity, the simulated network activity including simulation of the one or more parameters of the at least one network device,
    wherein the simulator is further configured to run a test subject network management application against the simulated network activity.

2. The system according to claim 1, wherein continuously recording data includes capturing specific components of network management traffic per device.

3. The system according to claim 1, which comprises a selector to allow a user to identify the at least one network device for which live data is to be recorded.

4. The system according to claim 3, which comprises a selector to allow a user to specify the at least one network device's parameters and/or properties that are to be recorded by the recording module.

5. The system according to claim 1, which comprises a selector to allow a user to select the period of time that the recording module is to continuously record data from the live network.

6. The system according to claim 1, wherein the recording module is configured to start recording after receiving an internal trigger from within the live network.

7. The system according to claim 1, wherein the recording module is configured to record parameters of a plurality of network devices.

8. The system according to claim 1, wherein the recorded network parameters further include at least one of performance statistics of the device, and logging of user interactions on the device.

9. The system according to claim 8, wherein the performance statistics includes CPU performance and/or memory performance of the device.

10. The system according to claim 1, wherein the parameters of the at least one network device included in the recorded data further comprises at least one of: failure of components on the device, syslog messages sent from the device, and trap messages sent from the device.

11. A method to capture network activity, the method comprising:
    substantially continuously recording data live, over a selected duration of time, from a database of a network management application running on the live network to manage at least one network device, the recording of the data comprising capturing a plurality of snapshots of at least part of the network management application database, each of the database snapshots being associated with a respective time within the selected duration of time, the recorded data including one or more parameters of the at least one network device, which parameters include at least one of: Management Information Base (MIB) information on the device, changes to operating system configuration on the device, interface IP address changes on the device, and Command Line Interface (CLI) commands executed on the device;
    storing the recorded data in memory;
    based substantially exclusively on data recorded by the recording module from the network management application database, creating a simulated network and simulated network activity, the simulated network activity including simulation of the one or more parameters of the at least one network device; and
    running a test subject network management application against the simulated network activity.

12. The method according to claim 11, which comprises identifying the at least one network device for which live data is to be recorded.

13. The method according to claim 12, which comprises receiving the at least one network device's parameters and/or properties that are to be recorded.

14. The method according to claim 11, which comprises receiving the duration of time that the data from the live network is to be recorded.

15. The method according to claim 11, wherein recording starts after receiving an internal trigger from within the live network.

16. The method according to claim 11, wherein recording the data includes recording parameters of a plurality of network devices.

17. The method according to claim 11, wherein the MIB information is Simple Network Management Protocol (SNMP) MIB-based information on the device.

18. The method according to claim 11, wherein the recorded network parameters further include at least one of performance statistics of the device, and logging of user interactions on the device.

19. The method according to claim 18, wherein the performance statistics includes CPU performance and/or memory performance of the device.

20. The method according to claim 11, wherein the MIB information is Simple Network Management Protocol (SNMP) MIB-based information on the device.

21. The method according to claim 11, wherein the parameters of the at least one network device included in the recorded data further comprises at least one of: failure of components on the device, syslog messages sent from the device, and trap messages sent from the device.

22. A system to capture and simulate network activity, the system comprising:
    means for substantially continuously recording data live, over a selected duration of time, from a database of a network management application running on the live network to manage at least one network device, the recording of the data comprising capturing a plurality of snapshots of at least part of the network management application database, each of the database snapshots being associated with a respective time within the selected duration of time, the recorded data including one or more parameters of the at least one device, which parameters include at least one of: Management Information Base (MIB) information on the device, changes to operating system configuration on the device, interface IP address changes on the device, and Command Line Interface (CLI) commands executed on the device;
    means for storing the recorded data in memory;
    means for creating, based substantially exclusively on data recorded by the recording module from the network management application database, a simulated network and simulated network activity, the simulated network activity including simulation of the one or more parameters of the at least one network device; and
    means for running a test subject network management application against the simulated network activity.

23. A non-transitory computer-readable medium embodying instructions to, when executed by a machine, cause the machine to:
    substantially continuously record data live, over a selected duration of time, from a database of a network management application running on the live network to manage at least one network device, the recording of the data comprising capturing a plurality of snapshots of at least part of the network management application database, each of the database snapshots being associated with a respective time within the selected duration of time, the recorded data including one or more parameters of the at least one device, which parameters include at least one of: Management Information Base (MIB) information on the device, changes to operating system configuration on the device, interface IP address changes on the device, and Command Line Interface (CLI) commands executed on the device; and
    store the recorded data in memory;
    based substantially exclusively on data recorded by the recording module from the network management application database, create a simulated network and simulated network activity, the simulated network activity including simulation of the one or more parameters of the at least one network device; and
    run a test subject network management application against the simulated network activity.

24. The computer-readable medium according to claim 23, wherein continuously recording data includes capturing specific components of network management traffic per device.

25. The computer-readable medium according to claim 24, which comprises a selector to allow a user to identify at least one network device that is to be recorded.

26. The non-transitory computer-readable medium according to claim 23, wherein the parameters of the at least one network device included in the recorded data further comprises at least one of: failure of components on the device, syslog messages sent from the device, and trap messages sent from the device.

* * * * *